United States Patent
Fiorita, Jr.

(10) Patent No.: US 9,581,347 B2
(45) Date of Patent: Feb. 28, 2017

(54) CLEAN ROOM CONTROL SYSTEM AND METHOD

(76) Inventor: John L. Fiorita, Jr., Cheswick, PA (US)

( * ) Notice: Subject to any disclaimer, the term of this patent is extended or adjusted under 35 U.S.C. 154(b) by 723 days.

(21) Appl. No.: 13/984,642

(22) PCT Filed: Feb. 16, 2012

(86) PCT No.: PCT/US2012/025445
§ 371 (c)(1),
(2), (4) Date: Aug. 9, 2013

(87) PCT Pub. No.: WO2012/112775
PCT Pub. Date: Aug. 23, 2012

(65) Prior Publication Data
US 2013/0324026 A1 Dec. 5, 2013

Related U.S. Application Data

(60) Provisional application No. 61/443,351, filed on Feb. 16, 2011.

(51) Int. Cl.
*B01L 1/04* (2006.01)
*F24F 3/16* (2006.01)
(Continued)

(52) U.S. Cl.
CPC ............... *F24F 3/161* (2013.01); *B01L 1/04* (2013.01); *F24F 11/0079* (2013.01);
(Continued)

(58) Field of Classification Search
CPC .................................................. F24F 3/161
(Continued)

(56) References Cited

U.S. PATENT DOCUMENTS 4,693,175 A * 9/1987 Hashimoto ............. F24F 3/161
454/187
4,699,640 A * 10/1987 Suzuki ...................... F24F 7/10
454/188

(Continued)

FOREIGN PATENT DOCUMENTS

JP 6346328 A 2/1988
JP 11351626 A 9/1999
(Continued)

OTHER PUBLICATIONS

Kupferman, HVAC Technical and Qualification Issues, Manufacture of sterile medicines—Advanced workshop for SFDA GMP inspectors, Nov. 2009, Nanjing, 65 pages.
(Continued)

*Primary Examiner* — Steven B McAllister
*Assistant Examiner* — Jonathan Cotov
(74) *Attorney, Agent, or Firm* — The Webb Law Firm

(57) ABSTRACT

In a system and method of controlling particulate count in a clean room having a number of compartments/zones in series, in response to a first level of energy consumption by speed adjustable fans supplying a first volume of air per unit of time to the clean room, differential air pressures are established in the clean room compartment/zone-by-compartment/zone in series from a first compartment/zone which has a requirement for the highest air pressure to a last compartment/zone which has a requirement for the lowest air pressure. In response to a second level of energy consumption by the speed adjustable fans supplying a second volume of air per unit of time to the clean room, the same differential air pressures are substantially maintained in the clean room.

19 Claims, 6 Drawing Sheets

(51) Int. Cl.
*F24F 11/00* (2006.01)
*F24F 11/02* (2006.01)

(52) U.S. Cl.
CPC ..... *F24F 11/022* (2013.01); *F24F 2011/0004* (2013.01); *Y02B 30/746* (2013.01)

(58) Field of Classification Search
USPC .......................................................... 454/187
See application file for complete search history.

(56) References Cited

U.S. PATENT DOCUMENTS

| | | | |
|---|---|---|---|
| 5,095,811 A * | 3/1992 | Shutic | B05B 15/1211 118/326 |
| 5,096,477 A * | 3/1992 | Shinoda | F24F 3/161 454/187 |
| 5,152,814 A * | 10/1992 | Nelson | A61G 10/005 55/385.2 |
| 5,391,218 A | 2/1995 | Jorgenson et al. | |
| 5,480,349 A | 1/1996 | Kolta | |
| 5,538,471 A | 7/1996 | Guiles, Jr. | |
| 5,711,785 A | 1/1998 | Maxwell | |
| 5,720,658 A | 2/1998 | Belusa | |
| 5,722,887 A | 3/1998 | Wolfson et al. | |
| 6,186,891 B1 * | 2/2001 | D'Andrea | F24F 3/161 454/187 |
| 6,755,734 B2 | 6/2004 | Yokoyama et al. | |
| 6,797,029 B2 * | 9/2004 | Lederer | H01L 21/67017 454/184 |
| 6,887,293 B1 | 5/2005 | Abad et al. | |
| 7,066,091 B2 | 6/2006 | Kumar | |
| 7,105,037 B2 * | 9/2006 | Olander | B01D 53/74 422/122 |
| 7,118,474 B2 * | 10/2006 | Bjordal | A61G 13/108 454/187 |
| 7,147,168 B1 | 12/2006 | Bagwell et al. | |
| 7,222,494 B2 | 5/2007 | Peterson et al. | |
| 7,625,277 B2 | 12/2009 | Palmer | |
| 7,749,303 B2 | 7/2010 | Wright | |
| 7,798,418 B1 | 9/2010 | Rudd | |
| 7,802,443 B2 | 9/2010 | Wetzel | |
| 7,854,135 B2 | 12/2010 | Stanimirovic | |
| 7,875,100 B2 | 1/2011 | Wright | |
| 2003/0040269 A1 * | 2/2003 | Yokoyama | F24F 3/161 454/52 |
| 2003/0127914 A1 | 7/2003 | Homan et al. | |
| 2004/0137836 A1 * | 7/2004 | Bjordal | A61G 13/108 454/228 |
| 2006/0234621 A1 * | 10/2006 | Desrochers | F24F 3/044 454/239 |
| 2007/0253831 A1 * | 11/2007 | Lee | F24F 3/161 417/5 |
| 2007/0264928 A1 * | 11/2007 | Chen | F24F 3/161 454/329 |
| 2008/0161976 A1 * | 7/2008 | Stanimirovic | F24F 11/0086 700/276 |
| 2008/0233860 A1 * | 9/2008 | Perry | F24F 7/06 454/238 |
| 2010/0291850 A1 * | 11/2010 | Sabbaghian | B08B 15/002 454/61 |

FOREIGN PATENT DOCUMENTS

| | | |
|---|---|---|
| JP | 2000320872 A | 11/2000 |
| JP | 2007205610 A | 8/2007 |

OTHER PUBLICATIONS

Siemens AG, Integrated clean room solutions for more safety, security, and efficiency, Siemens, Siemens Website, 2011, www.buildingtechnologies.siemens.com, 1 page.

\* cited by examiner

CLEAN ROOM CONTROL SYSTEM AND METHOD

CROSS REFERENCE TO RELATED APPLICATION

This application claims priority to U.S. Provisional Patent Application No. 61/443,351, filed Feb. 16, 2011, which is incorporated herein by reference.

BACKGROUND OF THE INVENTION

Field of the Invention

The present invention relates to clean rooms and, more particularly, to a clean room system and method where energy savings are realized at times when the clean room is not in use.

Description of Related Art

A clean room, typically used in manufacturing or scientific research, has a low level of environment pollutants, such as dust, airborne microbes, aerosol particulars and chemical vapors. More specifically, a clean room has a controlled level of contamination that is specified by the number of particles per cubic meter at a specified particle size.

A clean room can be very large. Entire manufacturing facilities can be contained within a clean room with factory floors covering thousands of square meters. Clean rooms are used extensively in semiconductor manufacturing, biotechnology, the life sciences, and other fields that are sensitive to environmental contamination and connecting genealogy information.

The air entering a clean room is filtered to exclude dust particles, and the air inside of the clean room is constantly re-circulated through high-efficiency particulate air (HEPA) filters and/or ultra-low penetration air (ULPA) filters to remove contaminants generated inside of the clean room.

Heretofore, air handling systems of clean rooms were continually operated at full capacity in order to maintain the cleanliness of the clean room at or below one or more predetermined international standards organization (ISO) levels, including, but not limited to USP797 and EU standards. It would, however, be desirable to provide a clean room control system and method that reduced the energy consumed by the air handling system of a clean room at times when the clean room was not in use while, at the same time, maintaining the cleanliness of the clean room at or below the predetermined ISO levels. It would also be desirable to provide a clean room control system and method that enabled the air handling system of the clean room to return to an operation state (where the air handling system operates at full capacity) from a low or reduced energy state upon demand, at predetermined times, or upon the occurrence of an unexpected event.

SUMMARY OF THE INVENTION

The invention is a method of controlling particulate count in the clean room that defines a plurality of compartments/zones and includes an air handling system having a plurality of speed adjustable fans and a plurality of position controllable return air dampers, wherein the air handling system is operative for supplying pressurized air to the clean room. The method includes: (a) controlling speeds of the plurality of fans and/or positions of the plurality of dampers whereupon air pressure in the clean room decreases compartment/zone-by-compartment/zone in series from a first compartment/zone which has a requirement for a lowest particulate count and hence a highest air pressure in the clean room to a last compartment/zone which has a requirement for a highest particulate count and hence a lowest air pressure in the clean room, wherein, in a direction from the first compartment/zone to the last compartment/zone, each compartment/zone in the series has a lower pressure than an immediately preceding compartment/zone; and (b) changing the speeds of the plurality of fans and/or the positions of the plurality of return air dampers in a manner that changes a volume of air per unit of time that moves through the clean room while maintaining the relationship that the first compartment/zone has the highest air pressure in the clean room, the last compartment/zone has the lowest air pressure in the clean room and, in the direction from the first compartment/zone to the last compartment/zone, each compartment/zone in the series has a lower pressure than an immediately preceding compartment/zone.

The method can further include at least one of the following: the air pressure of the first compartment/zone in step (b) can be different than the air pressure of the first compartment/zone in step (a); or the air pressure of the last compartment/zone in step (b) can be different than the air pressure of the last compartment/zone in step (a).

The compartment/zone-to-compartment/zone decrease in air pressure in step (b) can be the same or different than the compartment/zone-to-compartment/zone decrease in air pressure in step (a).

The change in step (b) can either decrease or increase the volume of air per unit of time that moves through the clean room.

The change in step (b) can occur in a stepwise manner compartment/zone-to-compartment/zone in series from the first compartment/zone to the last compartment/zone, or vice versa, based on whether the volume of air that moves through the clean room per unit of time is being increased or decreased.

Each particulate count is desirably below a predetermined particulate count.

The invention is also a method of controlling particulate count in the clean room having first, second and third compartments/zones in series. The method includes: (a) in response to a first level of energy consumption by speed adjustable fans supplying a first volume of air per unit of time to the clean room, establishing differential air pressures in the clean room such that the first, second and third compartments/zones have highest, intermediate and lowest air pressures, respectively, in the clean room; and (b) in response to a second level of energy consumption by the speed adjustable fans supplying a second volume of air per unit of time to the clean room, maintaining substantially the same differential air pressures of step (a) in the clean room.

The first volume of air per unit of time can be greater than the second volume of air per unit of time. The first level of energy consumption can be greater than the second level of energy consumption.

The method can further include: during transition from the first level of energy consumption to the second level of energy consumption, reducing a volume of air per unit of time supplied to the third compartment/zone first, reducing a volume of air per unit of time supplied to the first compartment/zone last, and reducing a volume of air per unit of time supplied to the second compartment/zone intermediate the reduction in the volumes of air per unit of time supplied to the third and first compartments/zones; and during transition from the second level of energy consumption to the first level of energy consumption, increasing a volume of air per unit of time supplied to the first compartment/zone first, increasing a volume of air per unit of time supplied to the third compartment/zone last, and increasing a volume of air per unit of time supplied to the second compartment/zone intermediate the increase in the volumes of air per unit of time supplied to the first and third compartments/zones.

The invention is also a clean room control system comprising: a plurality of speed adjustable fans operative for urging pressurized air into a number of compartments/zones of the clean room; a plurality of position adjustable dampers disposed in air ducts that access the clean room; and a controller operative for controlling the speeds of the fans and the positions of the dampers whereupon: in a first energy consumption state of the fans to move a first volume of air per unit of time through the clean room, a differential air pressure is established in the clean room between a first compartment/zone and a second compartment/zone; and in a second energy consumption state of the fans to move a second, lesser volume of air per unit of time through the clean room, the differential air pressure is substantially maintained in the clean room between the first compartment/zone and the second compartment/zone.

The first compartment/zone can have a higher air pressure than the second compartment/zone.

The controller can be further operative for controlling the speeds of the fans and the positions of the dampers whereupon: during transition from the first energy consumption state to the second energy consumption state, the air pressure in the second compartment/zone can be reduced before the air pressure in the first compartment/zone; and during transition from the second energy consumption state to the first energy consumption state, the air pressure in the first compartment/zone can be increased before the air pressure in the second compartment/zone.

In response to the opening of a clean room door at a time when the clean room is either in the second energy consumption state or is in transition from the first energy consumption state to the second energy consumption state, the controller can be operative for adjusting the speeds of the fans and the positions of the dampers substantially simultaneously to preset speed and positions or to speeds and positions associated with the first energy consumption state.

The controller can be further operative: for storing speeds of the fans and positions of the dampers associated with each energy consumption state; and for causing the speeds of the fans and the positions of the dampers associated with each energy consumption state to return to the stored speeds and positions upon entering said energy consumption state.

DETAILED DESCRIPTION OF THE INVENTION

The present invention will be described with reference to the accompanying figures where like reference numbers correspond to like elements.

Figure 1:
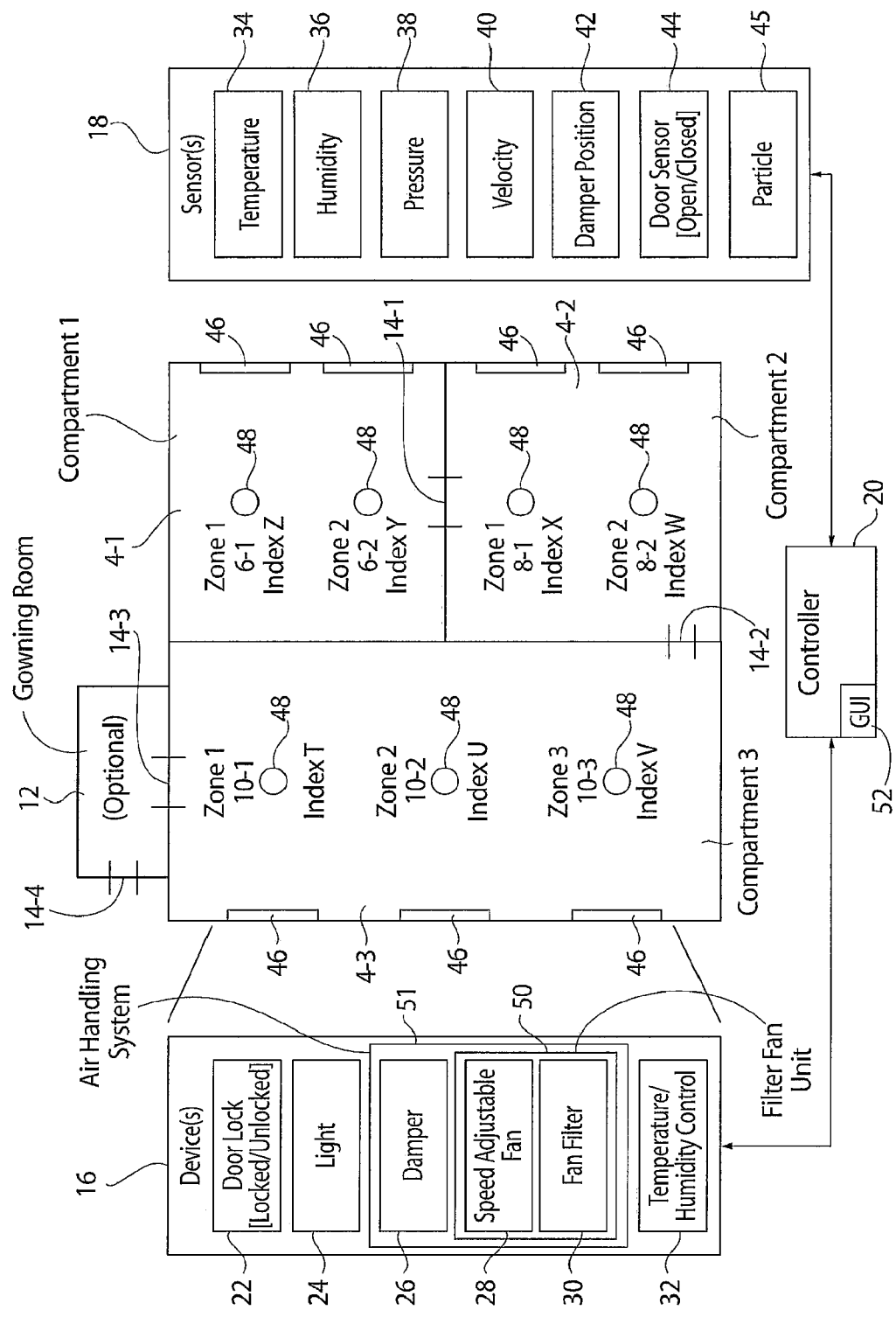
FIG. 1 is a block diagram drawing of an exemplary, non-limiting clean room including one or more devices operated under the control of the controller based on inputs from one or more sensors.

With reference to FIG. 1, a clean room 2 is a closed, controlled environment that includes one or more compartments 4. Each compartment 4 can include one or more zones (6, 8, 10) comprising a subsection within a compartment where one or more environmental conditions are controlled. The clean room 2 shown in FIG. 1 includes compartment 4-1 including zones 6-1 and 6-2; compartment 4-2 including zones 8-1 and 8-2; and compartment 4-3 including zones 10-1, 10-2, and 10-3. In addition, clean room 2 may include an optional gowning room 12 the workers desiring to enter clean room 3 can don appropriate clean room suits to prevent skin and hair from being shed into clean room 2.

It is to be appreciated that the layout and arrangement of clean room 2 shown in FIG. 1 is exemplary only and is not to be construed as limiting the invention since each clean room can include one or more compartments, with each compartment including one or more zones as deemed suitable and/or desirable by one of ordinary skill in the art for the designed purpose of the clean room 2.

Adjacent compartments 4 can be connected by a door or other suitable passageway to facilitate movement of people and/or materials between compartments. For example, clean room 2 includes door 14-1 between compartments 4-1 and 4-2; door 14-2 between compartments 4-2 and 4-3; door 14-3 between compartment 4-3 and the exterior of clean room 2, e.g., optional gowning room 12. If optional gowning room 12 is provided, then said gowning room 12 can include a door 14-4 between gowning room 12 and the environment outside of gowning room 12 and clean room 2.

Clean room 2 can include one or more devices 16, one or more sensors 18, and a controller 20 for controlling said one or more devices 16 based on the output of said one or more sensors 18. It is to be appreciated that clean room 2 can include any suitable and/or desirable number (including zero) and/or arrangement of any device 16 described hereinafter and/or any sensor 18 described hereinafter. Accordingly, the description herein of clean room 2 including any particular device(s) 16 and/or any particular sensor(s) 18 is not to be construed as limiting the invention.

Devices 16 may include, without limitation, one or more door locks 22; one or more lights 24; one or more dampers 16; one or more integral filter fan units 50, each of which comprises a speed adjustable fan 28 and a fan filter 30, and/or one or more temperature/humidity control units (e.g., HVAC units) 32. Under the control of controller 20, the locked or unlocked state of one or more door locks 22 on one or more doors 14 of clean room 2 can be controlled; the on/off state of one or more lights 24 in clean room 2 can be controlled; the position of one or more dampers 26 disposed in one or more return ducts 46 of clean room 2 can be controlled; the speed of one or more speed adjustable fans 28 that supply conditioned air into the clean room via supply ducts 48, typically disposed in the ceiling of clean room 2, can be controlled; and one or more temperature control/humidity units (e.g., HVAC units) 32 for controlling the temperature and/or the humidity of the conditioned air introduced into clean room 2 via filter fan units 50 and supply ducts 48, can be controlled. Typically, each fan filter 30 is a HEPA filter or a ULPA filter that provides high quality filtering of the air output by the speed adjustable fan 28 of a filter fan unit 50. Optionally, the function of each of one or more filter fan units 50 can be replaced with a separate speed adjustable fan 28 and a separate fan filter 30 which are not part of an integral unit. For the purpose of describing the present invention, reference hereinafter will be made to filter fan unit(s) 50. However, this is not to be construed as limiting the invention since it is envisioned that any such filter fan unit 50 can be replaced with a separate speed adjustable fan 28 and a separate fan filter 30 which are not part of an integral unit.

Sensors 18 may include, without limitation, one or more temperature sensors 34; one or more humidity sensors 36; one or more pressure sensors 38; one or more optional energy usage sensors (not shown); one or more velocity sensors 40, each of which is positioned and operative for detecting a velocity of air output by a filter fan unit 50 or a speed adjustable fan 28 of a filter fan unit 50; one or more damper position sensors 42, each of which is configured to detect the position of a corresponding damper 26; one or more door sensors 44 for detecting the open/closed state of one or more doors 14 of clean room 2; and/or one or more particle sensors 45.

Controller 20 is operative in the manner described hereinafter for sampling the output of one or more of said sensors 34-45 for logging purposes and for the purpose of controlling the state of one or more devices 22-28 and 32. The number and placement of each provided device 22-28 and 32, and each provided sensor 34-45 can be selected by one of ordinary skill in the art in any suitable or desirable manner that facilitates establishing a suitable and/or desirable environment within clean room 2. Hence, the configuration of clean room 2 shown in FIG. 1, the selection of any one or combination of devices 22-28 and 32 and sensors 34-45, and the placement of said devices and sensors within clean room 2 described herein is not to be construed as limiting the invention.

Having generally described clean room 2 and the devices 16 and sensors 18 that can typically be utilized to the control the environment within clean room 2, the present invention will now be described with reference to the operation of controller 20 utilizing devices 16 and sensors 18 to establish a suitable environment within clean room 2.

Airflow in clean room 2 is typically supplied by one or more filter fan units 50, each of which is comprised of a speed adjustable fan 28 and a fan filter 30. Desirably, the airflow supplied to clean room 2 via one or more filter fan units 50 is temperature and/or humidity controlled as necessary to desired level(s) by one or more temperature/humidity control units (e.g., HVAC units) 32. Each filter fan unit 50 can be of any suitable and/or desirable configuration. A common feature of a filter fan unit 50 is that it draws air from a plenum above clean room 2 and forces the air through a high grade fan filter 30 (e.g., a HEPA filter or a ULPA filter) and then through one or more supply ducts 48 from above into clean room 3 below. Each filter fan unit 50 can be connected to one or more supply ducts as deemed suitable and/or desirable by one of ordinary skill in the art.

Typically, a filter fan unit 50 will mount in the ceiling of clean room 2 and draw air from a supply plenum above the ceiling Via the filter 30 thereof, each filter fan unit 50 removes particulate from the supply air and typically moves the air in a laminar fashion from the ceiling of clean room 2 to the floor of clean room 2, picking up particles generated in the workspace as it moves. The vertically descending direction of the airstream from the filter fan unit urges particles into the airstream and towards the floor. At the floor, air moves generally laterally to return ducts 46 in or near the floor that pick up the now particulate laden air and route it back to the supply plenum in the ceiling that once again becomes the draw for the filter fan unit 50. Each return air duct 46 desirably includes a damper 26, the position of which inside the return air duct 46 can be adjusted to establish a specific differential pressure in each compartment or zone of clean room 2.

Differences in compartment or zone pressure differentials ensure that lateral infiltration of air only occurs from cleaner compartments or zones to compartments or zones with lower cleanliness standards within clean room 2. In this way, there exists a controlled cascade of descending pressures from compartments or zones having higher cleanliness requirements (e.g., ISO class 1) to compartments or zones having lower cleanliness requirements (e.g., ISO class 7).

Good practice requires the differential pressure of each compartment or zone to be continually or periodically measured and compared to compartments or zones adjacent as well as ambient conditions outside clean room 2.

In practice, the same particulate requirement level will be present throughout a compartment or zone within clean room 2. The one or more filter fan units 50 in the ceiling can be laid out in a way that creates two or more particulate levels in two or more adjacent zones in the same compartment and/or in two or more adjacent compartments. Accordingly, herein, "zones" within a compartment are focused on controlled particulate levels. As shown in FIG. 1, each compartment can have one or more zones. However, a zone can only exist in one compartment. Where a compartment includes two or more zones, the boundary between adjacent zones can be rigidly defined or loosely defined as deemed suitable and/or desirable by one of ordinary skill in the art.

A method of clean room control will now be described with reference to the flow chart of FIG. 2. In the following description, controller 20 operating under the control of a software program controls one or more devices 16 based upon inputs from one or more sensors 18 to control the environment within clean room 2 including, without limitation, one or more of the following: compartment and/or zone pressure differentials, particulate count, temperature, humidity, energy usage, damper position, etc.

Figure 2:
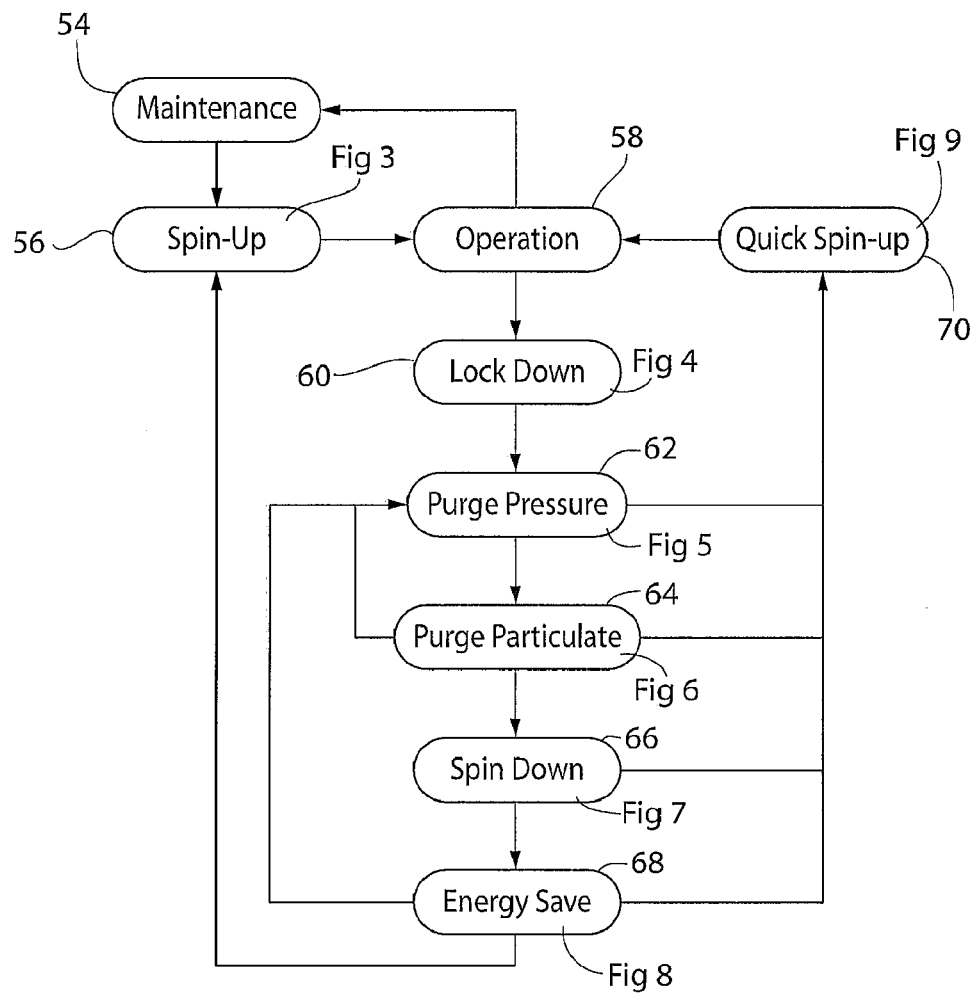
FIG. 2 is a flow diagram of a clean room control method in accordance with the present invention.

Referring now to FIG. 2, a method of clean room control in accordance with the present invention includes a maintenance step 54. Maintenance step 54 can be the initial system state when controller 20 is first initialized and is the state used to perform any maintenance on clean room 2 itself. When controller 20 is executing maintenance step 54 as the initial system state, controller 20 is not actively controlling devices 16 of clean room 2 based upon input from sensors 18. Rather, the devices 16 of clean room 2 are under the direct control of a user via a graphical user interface (GUI) 52 of controller 20. By way of GUI 52 and controller 20, the user can activate one or more devices 16 and/or can monitor the output of one or more sensors 18 of clean room 2.

Maintenance step 54 can be utilized when changing equipment, diagnosing issues, or making any configuration changes to clean room 2 itself, e.g., adding or eliminating any devices 16 and/or sensors 18. For example, it would not be necessary to change to maintenance step 54 just to alter a set-point or parameter of a given device 16. Desirably, when entering into maintenance step 54 from an operation step 58, controller 20 will continue to control the devices 16 of clean room 2 based on inputs from one or more sensors 18 and the operational parameters set in the operation step 58 (discussed hereinafter). In maintenance step 54, the user can alter or disable devices 16 or can cause controller 20 to ignore the output of one or more sensors 18, for example, when said one or more sensors are producing erroneous outputs.

Figure 3:
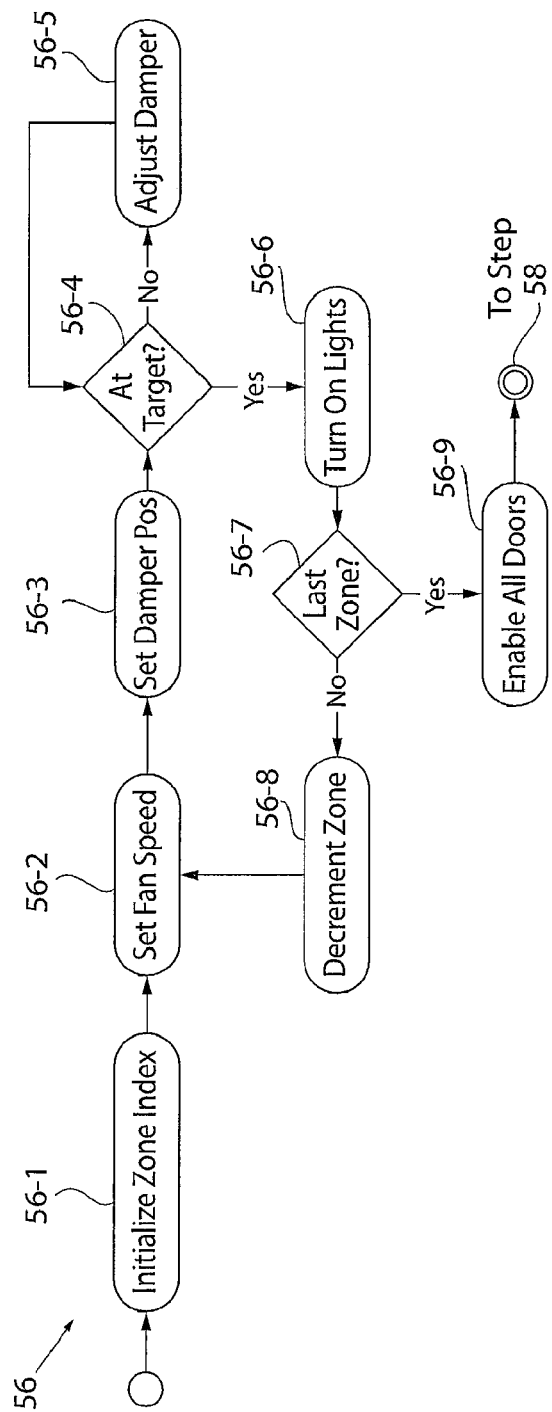
FIGS. 3-9 are flow diagrams of the steps comprising steps 56, 60, 62, 64, 66, 68, and 70 in FIG. 2.

At a suitable time, the method advances or can be advanced from maintenance step 54 to spin-up step 56. Details regarding spin-up step 56 can be found in FIG. 3.

In spin-up step 56, controller 20 prepares clean room 2 for active use by methodically activating each device in order. Spin-up step 56 includes step 56-1 wherein controller 20 initializes a zone index wherein the compartment/zone to have the highest regular operating pressure is set to index "Z". For example, controller can assign compartment index "Z" to compartment 4-1, zone 6-1 of clean room 2. Thereafter, for this compartment/zone combination, controller 20 executes step 56-2 wherein the speed of the speed adjustable fan 28 of the filter fan unit 50 supplying conditioned air to zone 6-1 is set to a desired set-point speed, typically maximum speed. However, a lower set-point speed for speed adjustable fan 28 could be selected, e.g., based on an output of a velocity sensor 40 detecting a velocity of air output by the filter fan unit 50 supplying conditioned air to zone 6-1. Thereafter, the method advances to step 56-3 where the position of the damper 26 in the return air duct 46 associated with zone 6-1 is set to a desired position based on the output of damper position sensor 42 associated with said damper 26. Thereafter, the method advances to step 56-4 wherein a decision is made whether the position of the damper of zone 6-1 is at a target value. If not, the method advances to step 56-5 where the position of the damper 26 in the return air duct 46 associated with zone 6-1 is adjusted and the method returns to step 56-4. Steps 56-4 and 56-5 are repeated as necessary until the position of the damper 26 associated with the return air duct 46 of zone 6-1 is set to a desired position based upon the output of the corresponding damper position sensor 42.

Once the damper 26 associated with the return air duct 46 of zone 6-1 has been set to a desired position (as determined by damper position sensor 42 of said damper), the method advances to step 56-6 wherein controller 20 causes the light(s) associated with zone 6-1 to turn on. The method then advances to step 56-7 where a decision is made whether or not all of the zones of all of the compartments of clean room 2 have been initialized. If not, the method advances to step 56-8 wherein controller 20 decrements the zone index to the zone having the next highest pressure in clean room 2. In this example, controller 20 decrements the compartment index to "Y" which is associated with compartment 4-1, zone 6-2.

Under the control of controller 20, steps 56-2-56-8 are repeated, as necessary, for compartment 4-1, zone 6-2; compartment 4-2, zone 8-1; compartment 4-2, zone 8-2; compartment 4-3, zone 10-3; compartment 4-3, zone 10-2; and compartment 4-3, zone 10-1 in order from the highest regular operating pressure in zone 6-1 to the lowest regular operating pressure in zone 10-1. Hence, zone 6-1 will have the highest differential pressure followed by zone 6-2 having the next lowest pressure, followed by zone 8-1 having the next lowest pressure, followed by zone 8-1 having the next lowest pressure, followed by zone 10-3 having the next lowest pressure, followed by zone 10-2 having the next lowest pressure, and followed by zone 10-1 having the lowest pressure in clean room 2.

In each instance of step 56-3, the damper 26 associated with the return air duct 46 in the corresponding compartment/zone is set to a learned or set-point position for regular operation. Step 56-5 is invoked for each compartment/zone combination as necessary to bring the pressure in said compartment/zone to a set-point pressure. This adjustment can be configured uniquely for each compartment/zone combination.

In step 56-6, the light(s) 24 for each compartment/zone combination can be turned on individually. Alternatively, the lights in each compartment can be turned on regardless of how many zones are in each compartment.

Upon initializing the fan speed, damper position, and, as necessary, the lights in steps 56-2-56-6 associated with compartment 4-3, zone 10-1 (in the present example), the method advances from step 56-7 to step 56-9 where all of the doors 14 are enabled (unlocked). Upon completion of step 56-9, the method advances to operation step 58 shown in FIG. 2.

In operation state 58, controller 20 controls the devices 16 based on inputs from sensors 18 to maintain the differential pressure in clean room 2 as set during spin-up step 56. In addition, controller 20 can be operative for controlling the temperature/humidity in clean room 2 and/or in each compartment/zone thereof via temperature/humidity control (e.g., HVAC) 32, temperature sensor 34 and/or humidity sensor 36 in a manner known in the art. Because controller 20 has access to the outputs of sensors 18, controller 20 is able to continuously, periodically, or randomly store for subsequent analysis the outputs of one or more of said sensors 18 for further reference (e.g., to provide historical data regarding whether clean room 2 was USP 797 compliant at a certain time and date. USP 797 is a set of sterile compounding standards issued by the United States Pharmacopeia). For example, controller 20 can be programmed to periodically, e.g., every minute, or every five minutes, sample and record by time and date the output of each temperature sensor 34, each humidity sensor 36, each pressure sensor 38, each velocity sensor 40, each particle sensor 45 and/or each damper position sensor 42 of clean room 2. Desirably, the temperature, humidity, pressure, air velocity and/or particle count in each compartment/zone combination is sensed by one or more corresponding temperature sensors 34, one or more humidity sensors 36, one or more pressure sensors 38, one or more velocity sensors 40, and/or one or more particle sensors 45. Also or alternatively, the temperature, humidity, pressure, air velocity, and/or particle count in each compartment can be detected and recorded by controller 20 via suitable temperature sensors 34, humidity sensors 36, pressure sensors 38, velocity sensors 40 and/or particle sensors 45 in one or more compartments regardless of the number of zones in said compartments. The decision whether to monitor and record temperature, humidity, pressure, air velocity, and/or particle count in each zone of each compartment or only at the compartment level can be made by one of ordinary skill in the art and, therefore, is not to be construed as limiting the invention.

Figure 4:
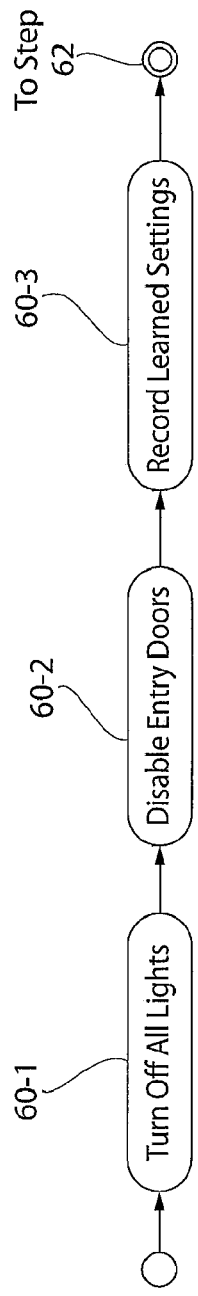

If desired, via GUI 52 of controller 20, a user can cause the method of FIG. 2 to return to maintenance step 54 and, subsequently, spin-up step 56 from operation state 58. Also or alternatively, under the control of a control program (or by way of a user and GUI 52), controller 24 can advance from operation step 58 to a lockdown step 60. Details regarding lockdown step 60 are shown in FIG. 4.

Lockdown step 60 includes step 60-1-60-3 where controller 20, under the control of the software program or under the control of a user via GUI 52, turns off all lights of clean room 2, disables (locks) doors 14, and records the output/settings of one or more of the following: each temperature sensor 34, each humidity sensor 36, each pressure sensor 38, each damper position sensor 42 and/or each particle sensor 45. Also or alternatively, controller 20 can record the present setting of each speed adjustable fan 28. To this end, controller 20 can either record the output state of control signals output by controller 20 to each speed adjustable fan 28 and/or can sample the output of a tachometer (not shown) coupled to each speed adjustable fan 28.

Lockdown step 60 is utilized to prepare the clean room 20 for entry into an energy savings state implemented by energy save step 68 (described hereinafter).

Figure 5:
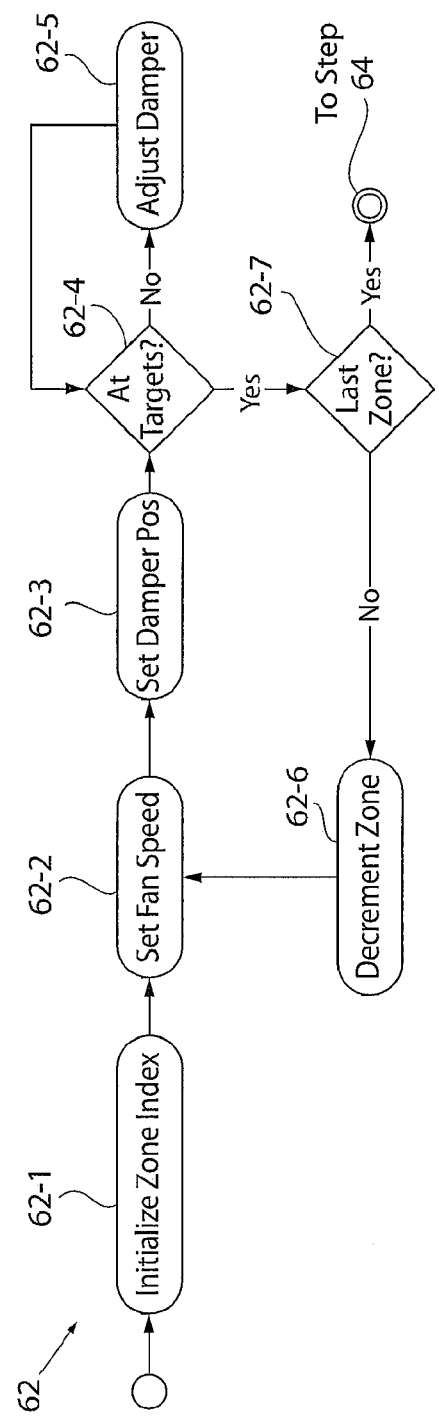

Upon completion of lockdown step 60, the method advances to purge pressure step 62. Details regarding purge pressure step 62 can be found in FIG. 5.

In response to executing purge pressure step 62, controller causes the various compartments/zones of clean room 2 to attain target purge pressures. This action occurs one compartment/zone at a time from the highest operating pressure to the lowest operating pressure. Specifically, starting in step 62-1, controller initializes a zone index, wherein each zone is assigned an index value. For example, zone 6-1 is assigned index value "Z", zone 6-2 is assigned index value "Y", zone 8-1 is assigned index value "X", and so forth through index value "T" for zone 10-1.

Thereafter, for index value Z, controller executes steps 62-2 and 62-3 wherein the fan speed of each speed adjustable fan 28 associated with zone 6-1 and the position of each damper 26 associated with zone 6-1 are set to target values. In step 62-4, controller determines, by sampling the output of one or more pressure sensors associated with zone 6-1 associated with index value Z, if a target purge pressure has been achieved. If not, the method advances to step 62-5 wherein damper(s) 26 of the return air duct(s) 46 associated with zone 6-1 is/are adjusted whereafter the method returns to step 62-4 to determine if zone 6-1 associated with index value Z is at the target pressure. Controller 20 repeats steps 62-4 and 62-5 as necessary until zone 6-1 associated with index value Z is at the target purge pressure. Thereafter, the method advances to step 62-7 wherein controller 20 determines if the last zone index value has been reached. If not, the method advances to step 62-6 wherein the index value is decremented and steps 62-2, 62-3, 62-4, 62-7, and, as necessary, step 62-5 are repeated for the next zone. Step 62-2-62-7 are repeated, as necessary, until in one instance of step 62-7, it is determined that the index value has been decremented to the final index value (in this example, index value T) whereupon purge pressure step 62 terminates and the method advances to purge particle step 64. Details regarding purge particular step 64 can be found in FIG. 6.

Purge particulate step 64 includes step 64-1 wherein purge particle timers of controller 20 are started. Desirably, a purge particle timer is defined for each zone of clean room 2. It is envisioned that each zone should reach its target particle count before the timer associated with said zone expires. The timers may have different durations for each zone.

The method then advances to step 64-2 wherein controller 20 determines for all of the compartments and/or zones via the particle sensors 45 thereof the current particle counts in said compartments and/or zones. The method then advances to step 64-3 where controller 20 determines if all of the compartments and/or zones are at target particle counts. If not, the method advances to step 64-5 wherein controller 20 determines if any of the purge particle timers have expired. If not, controller 20 repeats steps 64-2, 64-3, and, as necessary, step 64-5.

If, in any iteration of step 64-3, controller 20 determines that all of the compartments and/or zones are at target particle counts, the method advances to step 64-4 wherein controller 20 records current air damper positions and filter fan speeds as "learned" purge values since these values are what was necessary to reach the purge condition. These learned values can then be utilized the next time a purge is requested. Following step 64-4, controller 20 terminates purge particle step 64 and advances to spin-down step 66.

Figure 6:
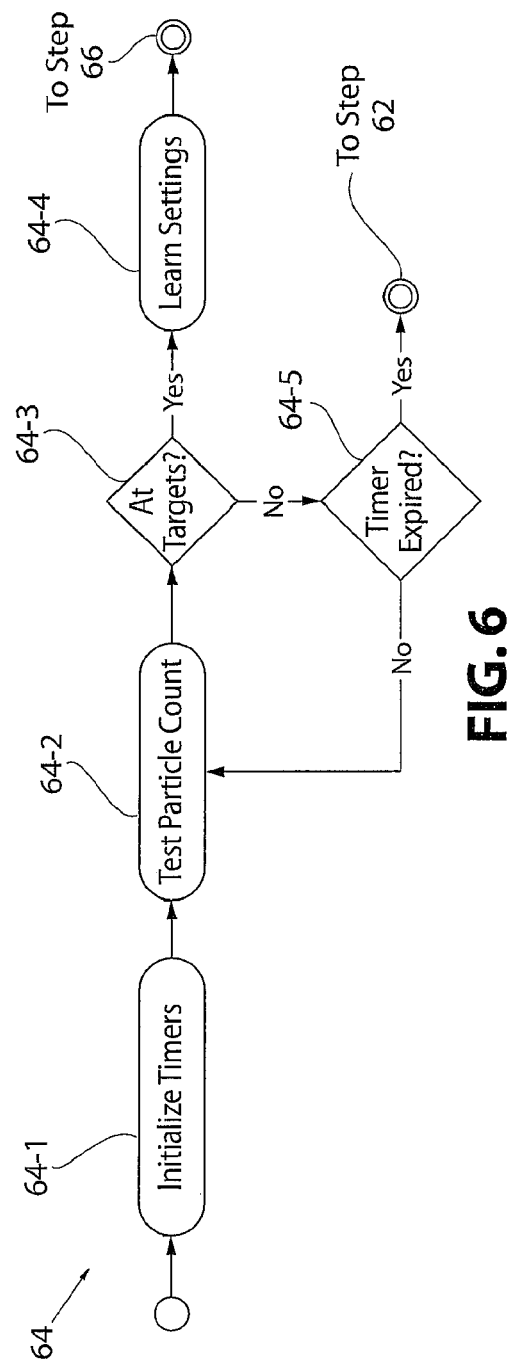
Figure 7:
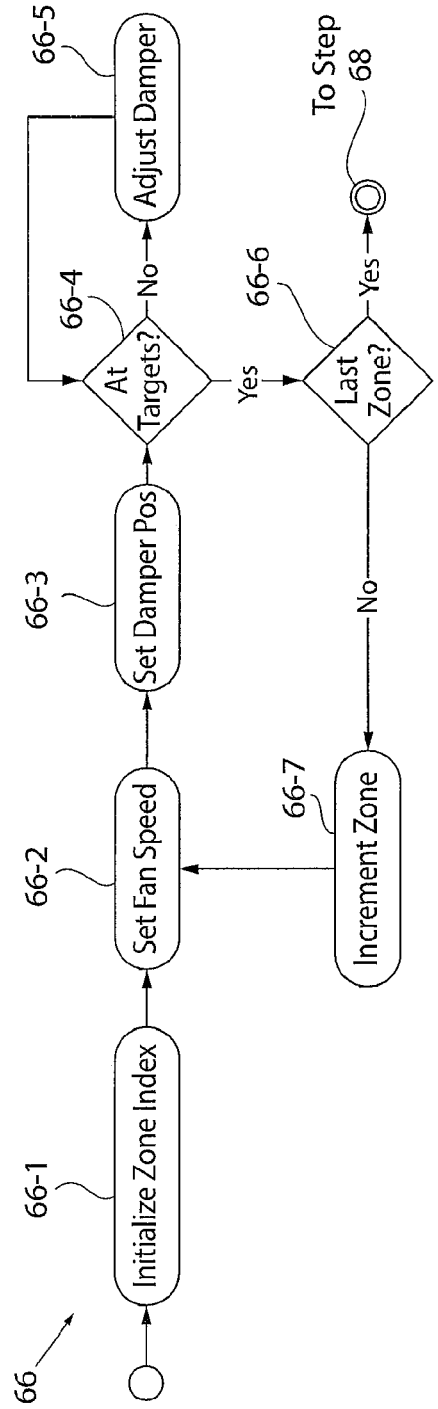

If, during any iteration of step 64-5, controller 20 determines that any zone timer has expired, controller 20 terminates purge particle step 64 and returns to purge pressure step 62. Thereafter, steps 62 and 64 are repeated, as necessary, until controller 20 determines in an iteration of step 64-3 that all of the target particle counts have been achieved whereupon the method advances to spin down step 66 (FIG. 2) via step 64-4 (FIG. 6). Details regarding spin-down step 66 can be found in FIG. 7.

Spin-down step 66 adjusts the pressure in each compartment and/or zone, after purge pressure step 62 is complete, such that all of the compartments/zones have the proper relative pressures. Compartments and/or zones are handled one at a time starting with the compartment or zone having the lowest regular operating pressure, e.g., zone 10-1. Specifically, beginning with step 66-1, controller initializes a zone index for the zones of the clean room. In the exemplary clean room 2 shown in FIG. 1, zone 10-1 is assigned index value T, zone 10-2 is assigned index value U, zone 10-3 is assigned index value V, zone 8-2 is assigned index value W, zone 8-1 is assigned index value X, zone 6-2 is assigned index value Y, and zone 6-1 is assigned index value Z.

Starting with zone 10-1 associated with index value T, controller 20 executes steps 66-2 and 66-3 wherein the speed(s) of the speed adjustable fan(s) 28 and the position(s) of the damper(s) 26 associated with zone 10-1 are set for spin-down. At step 66-4, controller 20 determines if the one or more damper(s) associated with zone 10-1 associated with index value T are at target values. If not, the method advances to step 66-5 wherein controller 20 further adjusts the position of the damper(s) 26 associated with zone 10-1 associated with index value T. Steps 66-4 and 66-5 are then repeated, as necessary until, in an iteration of step 66-4, controller 20 determines that the damper(s) of zone 10-1 associated with index value T is/are set at a target value(s). Thereafter, the method advances to step 66-6 wherein controller 20 determines if steps 66-2-66-4 and, if necessary, step 66-5 have been executed for the last zone (in this example zone 6-1 associated with index value Z). If not, the method advances to step 66-7 where the index value is incremented. Thereafter, controller 20 repeats steps 66-2-66-4, 66-6, and, as necessary, step 66-5 for the next zone (in this example, zone 10-2 associated with index value U).

Controller 20 repeats steps 66-2-66-7, as necessary, for each index value and, hence, zone of clean room 2. If, in any iteration of step 66-6, controller determines that the method of steps 66-2-66-7 has reached the last zone (in this example zone 6-1 associated with index value Z) the method exits spin-down step 66 and advances to energy save step 68.

During spin-up step 56 and spin-down step 66, the pressure in each compartment and/or zone is controlled in a manner to maintain the differential pressure in clean room 2 such that zone 6-1 always has the highest differential pressure, zone 6-2 has the next lowest pressure, zone 8-1 has the next lowest pressure, zone 8-2 has the next lowest pressure, zone 10-3 has the next lowest pressure, zone 10-2 has the next lowest pressure, and zone 10-1 always has the lowest pressure.

Figure 8:
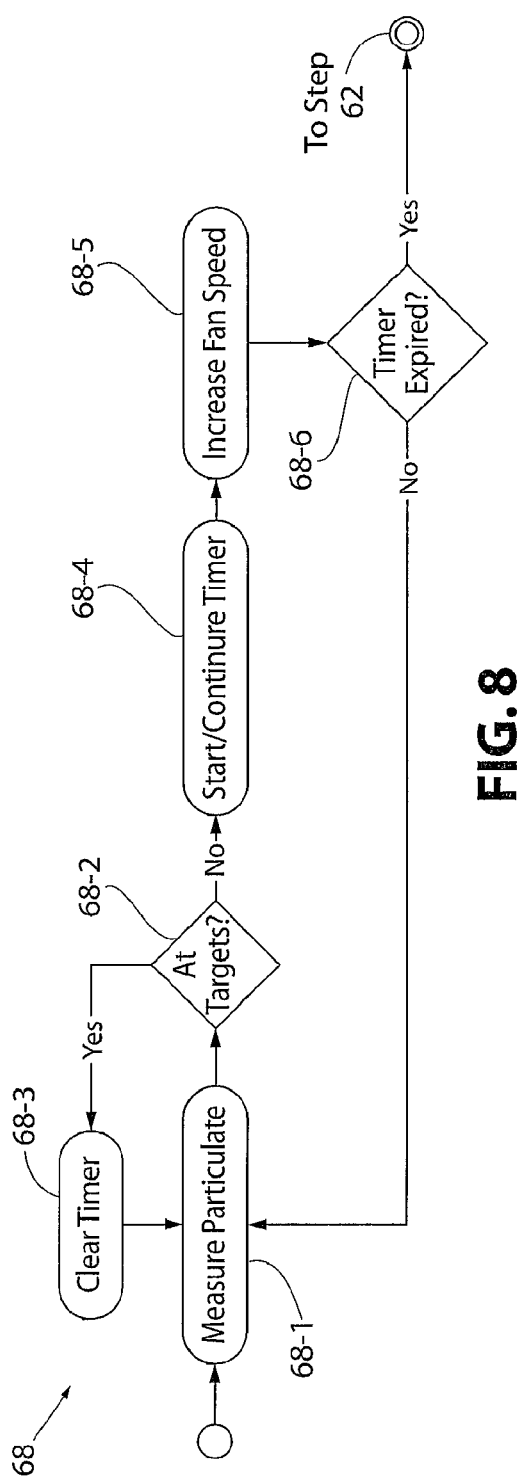

Details regarding energy save step 68 will now be described with reference to FIG. 8. In energy save step 68, controller 20 monitors particle counts (via corresponding particle sensors 45) in all of the zones to verify that said particle counts are at set-point or predetermined levels. When any zone is outside of its set-point particulate count level for a period of time specified for said zone, controller 20 will exit energy save step 68, return to purge pressure step 62, and repeat steps 62-66 until the method returns to energy save step 68.

Energy save step 68 includes step 68-1 wherein controller 20, via particle sensors 45 in clean room 2, measures particle counts in each zone and compares the measured particle count in each zone to a particle count set-point value for said zone. It is envisioned that the measurement of particle counts in any particular zone may require multiple measurements depending on the configuration of the zone. The method then advances to step 68-2 wherein controller 20 determines if the particle counts in all of the measured zones are at or below set-point particle counts for said zones. If so, the method advances to step 68-3 wherein a software timer of controller 20 is cleared and the method returns to step 68-1.

If, however, at step 68-2 controller 20 determines that the particle count in at least one zone is greater than the particulate count set point for said zone, controller 20 can activate (start) an internal timer of controller 20 in step 68-4 and, in step 68-5, controller 20 can cause the speed of one or more speed adjustable fans 28 and/or the position of one or more dampers 26 in said zone to increase and/or change position, respectively, in an attempt to reduce the particulate count in said zone to its target or set-point particle count. It is envisioned that the increase in speed of each speed adjustable fan 28 and/or the position of each damper 26 that can effect the particulate count in said zone can vary.

The method then advances to step 68-6 where controller 20 determines if the timer activated in step 68-4 has expired. If not, the method returns to step 68-1 whereupon controller repeats steps 68-1-68-6, as necessary. In the method shown in FIG. 8, once the timer of step 68-4 has been started, in each iteration of step 68-4 thereafter, the timer will continue to be decremented until it is determined in an iteration of step 68-6 that the timer has expired or the timer is cleared (reset) in an iteration of step 68-3. If, in any iteration of step 68-6, controller 20 determines that its timer has expired, the method exits energy save step 68 and returns to purge pressure step 62 whereupon controller 20 repeats steps 62-66, as necessary, to return to energy save step 68.

Assuming controller 20 is executing energy save step 68 and clean room 2 is in an energy save mode, at a suitable time (such as the start of a workday) programmed into software/scheduler running on controller 20 or upon controller 20 receiving a user request via GUI 52, the method advances from energy save step 68 back to spin-up step 56 wherein the fan speeds and the damper positions are set one at a time in series from the zone having the highest differential pressure (zone 6-1) in series to the zone having the lowest differential pressure (zone 10-1) in the manner described above in connection with FIG. 3.

Figure 9:
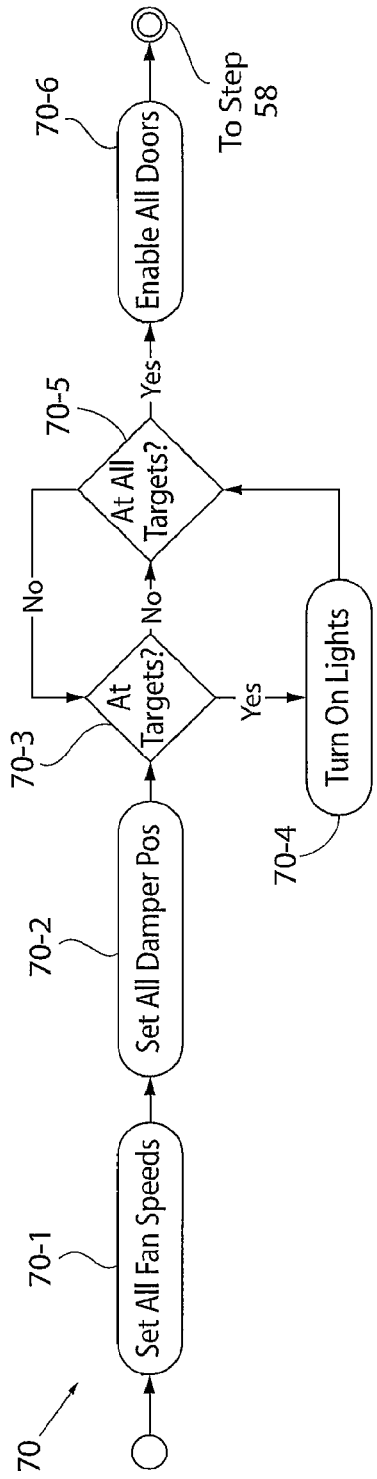

If during execution of any step 62, 64, 66, or 68, controller 20 detects an unexpected event, e.g., the opening of door 14-4 or 14-3 indicative of an individual entering gowning room 12 or compartment 3, controller 20 interrupts the execution of said step and commences executing quick spin-up step 70 wherein all of the speed adjustable fans 28 and all of the dampers 24 are activated in parallel, instead of sequentially, one at a time, as would occur during spin-up step 56. Details regarding quick spin-up step 70 can be found in FIG. 9.

In response to entering quick spin-up step 70, controller 20 executes steps 70-1 and 70-2 wherein the speeds of all of the speed adjustable fans 28 and the positions of all of the dampers 26 are set in parallel—versus serially or sequentially as would occur during spin-up step 56. The method then advances to step 70-3 wherein controller 20 determines if the speed of each speed adjustable fan 28 and the position of each damper 26 are at target, set-point values. If not, controller 20 continuously executes steps 70-3 and 70-5 until the speeds of all of the speed adjustable fans 28 and the positions of all of the dampers 26 are at target, set-point values. If, during an iteration of step 70-3, controller 20 determines that all of the speed adjustable fans 28 are at their set-point speeds and all of the dampers 26 are at their set-point positions, the method advances to step 70-4 wherein controller 20 causes the lights of clean room 2 to turn on. Thereafter, the method advances to step 70-5 wherein controller 20 confirms that the speeds of all of the speed adjustable fans 28 and the positions of all of the dampers 26 are at target or set-point values. If so, the method advances to step 70-6 wherein controller 20 enables (unlocks) all of the doors 14. Upon exiting step 70-6, controller 20 exits quick spin-up step 70 and returns to operation step 58 (described above). The set-point values utilized for the speeds of the speed adjustable fans 28 and the positions of the dampers 26 in quick spin-up step 70 desirably are the values that were utilized in the last execution of operation step 58. However, this is not to be construed as limiting the invention since it is envisioned other set-point values can be used for the speeds of the speed adjustable fans 28 and the positions of dampers 26 in quick spin-up step 70.

As can be seen, the present invention provides for smooth transitions between operation step 58 and energy save step 68, or vice versa, that ensures that clean room 2 maintains suitable differential pressures in the various zones thereof to maintain zone 6-1 at the lowest particulate count, zone 6-2 at a slightly higher particulate count, zone 8-1 at a yet slightly higher particulate count, and so forth until zone 10-1 which has the highest particulate count of any of the zones of clean room 2. In this manner, zone 6-1 can be maintained at the lowest particulate count (highest cleanliness) while zone 10-1 can be maintained at the highest particulate count (lowest cleanliness) for clean room 2 whereupon particles entering zone 6-1 will be generally urged by the flow of air in clean room 2 to return air ducts 46 in zone 6-1 and then sequentially to return air ducts 46 in zone 6-2, zone 8-1, zone 8-2, zone 10-3, zone 10-2, and, filially, zone 10-1.

In addition, in the event of an unexpected event, such as an individual unexpectedly entering door 14-4 or door 14-3 when controller 20 is in any one of steps 62-68, controller 20 can enter quick spin-up step 70. In quick spin-up step 70, controller 20 causes all of the speed adjustable fans 28 and all of the dampers 26 to assume set-point states or conditions substantially simultaneously in a manner that ultimately results in clean room 2 having a differential pressure that flows counterclockwise (in the illustration of clean room 2 of FIG. 1) from zone 6-1 having the highest differential pressure to zone 10-1 having the lowest differential pressure of clean room 2, as described above.

As can be seen, when controller 20 is executing operation step 58, devices 16 are controlled to maintain the environment in clean room 2 within predetermined levels when people are present in the room. For example, in a typical ISO class 5 clean room, the differential pressure in zone 6-1 can be controlled to be 0.002 millimeters of water above ambient air pressure (or below ambient air pressure, e.g., in a chemical clean room) and speed adjustable fans 28 can be controlled to provide air exchanges in clean room 2 at a rate between 20-600 air exchanges per hour, depending on the purpose of clean room 2.

Controller 20 can exit operation step 58 and execute steps 60-68 at any suitable and/or desirable time when it was known that for some minimum interval of time thereafter clean room 2 will be free of people as internal particle generators.

In steps 60 and 62, controller 20 turns off all lights (desirably all non-emergency lights) in clean room 2 and disables (locks) doors 14-1 and 14-2. Desirably, controller 20 maintains doors 14-3 and 14-4 in unlocked states whereupon entry into clean room 2 occurs via door 14-3. Controller 20 can monitor door 14-3 via a suitable door sensor 44 which, if door 14-3 is opened when controller 20 is in any one of steps 62-68, controller 20 terminates processing of said step and advances to quick spin-up step 70.

The last step performed by controller 20 before exiting lockdown step 60 is to record the current settings of speed adjustable fans 28, the current positions of dampers 26 (via damper position sensors 42), and the settings of other controlled devices 16 that will respond faster knowing the last settings that operation step 58 required of said devices 16.

In steps 62 and 64, controller 20 reduces the speeds of the speed adjustable fans 28 of clean room 2 and sets the positions of dampers 26 in a manner to reduce the energy consumed by the speed adjustable fans 28 while, simultaneously, maintaining particle counts in the various zones of clean room 2 at or below predetermined, acceptable levels. It is envisioned that the speed of each speed adjustable fan 28 and the position of each damper 26 in purge pressure step 62 and purge particle step 64 can be the same or different than the speed of each speed adjustable fan 28 and the position of each damper in operation step 58. For example, if the target particle count in each compartment and/or zone of clean room 2 can be met in steps 62 and 64 by maintaining the speed of each speed adjustable fan 28 and the position of each damper 26 at the same speed and position that they were in operation step 58, then controller 20 will make no change in the speed of each speed adjustable speed adjustable fan 28 and/or the position of each damper 26. On the other hand, upon controller 20 entering steps 62 and 64, if it is determined that increasing (or decreasing) the speed of one or more speed adjustable fans 28 and/or adjusting the position of one or more dampers 26 will maintain the particle counts in each compartment and/or zone of clean room 2 at predetermined, acceptable levels, then controller 20 can adjust the speed of the one or more speed adjustable fans 28 and/or the position of one or more dampers 26 as necessary to maintain the particle counts in each compartment and/or zone of clean room 2 at or below the predetermined, acceptable levels.

During execution of step 62, the differential pressures in the various compartments and/or zones of clean room 2 are maintained as they were in operation step 58. Thus, if during operation step 58 zone 6-1 has the highest differential pressure, zone 10-1 has the lowest differential pressures and the zones moving in a clockwise direction from zone 6-1 to zone 10-1 have progressively decreasing differential pressures, upon execution of step 62, this same differential pressure is substantially maintained. However, it is envisioned that the absolute pressure in each compartment or zone of clean room 2 can be different during operation step 58 and purge pressure step 62. For example, during operation step 52, the pressure in zone 6-1 may be controlled to be 0.002 millimeters of water above or below ambient air pressure, whereas during purge pressure step 62, the pressure in zone 6-1 may be controlled to be 0.001 millimeters of water above or below ambient pressure. However, this is not to be construed as limiting the invention since it is also envisioned that each compartment and/or zone of clean room 2 can have the same pressure above ambient pressure in operation step 58 and purge pressure step 62.

Once controller determines that all of the compartments and/or zones of clean room 2 are at predetermined target particle count levels, controller 20 advances to spin-down step 66 where the energy consumed to maintain clean room 2 at or below predetermined, acceptable particle count levels is reduced by reducing the speeds of the speed adjustable fans 28. As noted above, this is done while preserving the particulate counts in each zone at or below target particulate counts for each zone of clean room 2. The lowering of the speed of each speed adjustable fan is accomplished in a stepwise manner that preserves the intended pressure differentials between each compartment and/or zone of clean room 2. To this end, during spin down step 66, controller 20 commences decreasing the speeds of the speed adjustable fans 28 and, as necessary, controlling the positions of dampers 26, starting with the speed adjustable fan(s) 28 and dampers 26 that service the compartment or zone having the lowest differential pressure (in this case zone 10-1) and progressing zone-by-zone to the speed adjustable fan(s) 28 and damper(s) 26 that service the compartment or zone having the highest differential pressure (in this case zone 6-1). More specifically, controller 20 causes the speed adjustable fan(s) 28 servicing each compartment and/or zone to decrease to predetermined target speed(s) that are either programmed into controller 20 or which controller 20 learned the last time energy save step 68 was executed. Correspondingly, controller 20 causes one or more dampers 28 controlling return air flow to move to preprogrammed positions or positions controller 20 learned the last time energy save state 68 was executed.

Once controller 20 enters energy save step 68, it remains there until it perceives a particle count failure, an unexpected entry into gowning room 12 or compartment 4-3, or a request (either an operator initiated request or a preprogrammed event scheduler request) to exit energy save step 68 and return to operation step 58 via spin-up step 56.

Particle count failure can occur in one of two ways: (1) the particle count in any compartment or zone rises above a predetermined particle count specifically defined for that compartment or zone; or (2) the particle count in any compartment or zone rises above a predetermined particle count for the energy save step 68 and cannot be reduced within energy save step 68 by increasing the fan speed in step 68-5 for a period of time defined by the timer value of step 68-4. More specifically, if at any time controller 20 is in energy save step 68 and it is determined that the particle count in any compartment or zone is above a predetermined particle count value, controller 20 raises the speed(s) of one or more of the speed adjustable fan(s) 28 in step 68-5 in an effort to lower the particulate count in that specific compartment or zone to the predetermined particulate count. If controller 20 cannot lower the particle count in any zone before the timer initiated in step 68-4 expires, controller 20 exits energy save step 68 and returns to and executes steps 62-66 for the entire clean room 2.

Desirably, controller 20 is programmed to exit energy save step 68 and return to operation step 58 via spin-up step 56 in response to an operator request via GUI 52 or via event scheduler software running on controller 20 causing controller 20 to exit energy save step 68. Desirably, the event scheduler software running on controller 20 schedules when controller automatically exits operation step 58 and energy save step 68. For example, the event scheduler software miming on controller 20 can be programmed to exit energy save step 68 and enter operation step 58 during normal working hours of clean room 2. In contrast, the event scheduler software can be programmed to exit operation step 58 and enter energy save step 68, via steps 62-66, during non-working hours of clean room 2.

During execution of any of steps 62-68, if controller 20 detects an unexpected event, such as, without limitation, a person entering gowning room 12, controller 20 can terminate execution of said step and advance to quick spin-up step 70 where all of the speed adjustable fans 28 and all of the dampers 26 are simultaneously set to the speeds and states (positions) used by controller 20 during operation step 58. In addition, the lights in each compartment and/or zone can be turned on.

If desired, sensor(s) 18 can include one or more suitable electrical power sensors (not shown) coupled to controller 20 and operative for detecting the electrical power consumed by the devices 16 of clean room 2 during one or more of the steps shown in FIG. 2. By way of these one or more power sensors, controller 20 can continuously, periodically, or randomly store the electrical power consumed by the devices 16 of clean room 2 for subsequent analysis, e.g., for comparison to target electrical power consumptions during different days and/or times, for electrical power consumption trend analysis, and the like.

Desirably, controller 20 is operatively coupled with a fire detection system (not shown) of clean room 2 such that in response to activation of the fire detection system under an actual emergency condition (versus a testing condition), controller 20 automatically shuts down one or more or all of devices 22-28 and 32. For example, in response to activation of the fire detection system under an actual emergency condition, controller 20 terminates the operation or causes the termination of the operation of the one or more temperature/humidity control units 32 and the one or more speed adjustable fans 28 of clean room 2, and causes one or more dampers 26 of clean room to move to fully closed positions.

Controller 20 can be optionally communicatively coupled (directly or via a suitable computer network, such as, without limitation a dedicated computer network, the interne, or some combination thereof) to a remote recording and alarm system (not shown) which can be operative for remotely storing one or more periodically sampled and recorded outputs of one or more temperature sensors 34, one or more humidity sensors 36, one or more pressure sensors 38, one or more velocity sensors 40, and/or one or more particle sensors 45. This stored data can be utilized in the same manner as the data stored locally by controller 20, namely, for further reference (e.g., to provide historical data regarding whether clean room 2 was USP 797 compliant at a certain time and date. USP 797 is a set of sterile compounding standards issued by the United States Pharmacopeia). The remote storage of this data can be utilized to independently verify the accuracy of the data originally acquired by controller 20.

The recording and alarm system can also be operative for generating remote alarms to, for example, land-line based or cellular telephones, pagers, email address, and the like when any of one or more sensors detects an anomalous condition within clean room 2, e.g., excessive humidity or temperature, excessive particle count, improper pressure cascade, improper pressure relative to ambient pressure (for example, clean room is at a pressure higher than ambient pressure but is designed to be at a pressure below ambient pressure), and the like.

This invention has been described with reference to an exemplary embodiment. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. In a clean room defining a plurality of compartments/zones and including an air handling system having a plurality of speed adjustable fans and a plurality of position controllable return air dampers, wherein the air handling system is operative for supplying pressurized air to the clean room, a method of controlling particulate count in the clean room comprising:
   (a) controlling speeds of the plurality of fans and/or positions of the plurality of dampers whereupon air pressure in the clean room decreases compartment/zone-by-compartment/zone in series from a first compartment/zone which has a requirement for a lowest particulate count and hence a highest air pressure in the clean room to a last compartment/zone which has a requirement for a highest particulate count and hence a lowest air pressure in the clean room, wherein, in a direction from the first compartment/zone to the last compartment/zone, each compartment/zone in the series has a lower pressure than an immediately preceding compartment/zone;
   (b) changing the speeds of the plurality of fans and/or the positions of the plurality of return air dampers in a manner that changes a volume of air per unit of time that moves through the clean room while maintaining the relationship that the first compartment/zone has the highest air pressure in the clean room, the last compartment/zone has the lowest air pressure in the clean room and, in the direction from the first compartment/zone to the last compartment/zone, each compartment/zone in the series has a lower pressure than an immediately preceding compartment/zone; and changing the speeds of the plurality of fans and/or the position of the plurality of return air dampers in response to determining a particle count of a compartment/zone exceeds a corresponding predetermined compartment/zone particle count.

2. The method of claim 1, further including at least one of the following:
   the air pressure of the first compartment/zone in step (b) is different than the air pressure of the first compartment/zone in step (a); and
   the air pressure of the last compartment/zone in step (b) is different than the air pressure of the last compartment/zone in step (a).

3. The method of claim 1, wherein the compartment/zone-to-compartment/zone decrease in air pressure in step (b) is the same or different than the compartment/zone-to-compartment/zone decrease in air pressure in step (a).

4. The method of claim 1, wherein the change in step (b) either decreases or increases the volume of air per unit of time that moves through the clean room.

5. The method of claim 1, wherein the change is step (b) occurs in a stepwise manner compartment/zone-to-compartment/zone in series from the first compartment/zone to the last compartment/zone, or vice versa, based on whether the volume of air that moves through the clean room per unit of time is being increased or decreased.

6. The method of claim 1, wherein each particulate count is below a predetermined particulate count.

7. The method of claim 1, further comprising changing the speeds of the plurality of fans and/or the positions of the plurality of return air dampers in response to determining the particle count of each compartment/zone no longer exceeds the corresponding predetermined compartment/zone particle count.

8. In a clean room having first, second and third compartments/zones in series, a method of controlling particulate count in the clean room comprising:
(a) in response to a first level of energy consumption by speed adjustable fans supplying a first volume of air per unit of time to the clean room, establishing differential air pressures in the clean room such that the first, second and third compartments/zones have highest, intermediate and lowest air pressures, respectively, in the clean room;
(b) in response to a second level of energy consumption by the speed adjustable fans supplying a second volume of air per unit of time to the clean room, maintaining substantially the same differential air pressures of step (a) in the clean room; and changing the speeds of the plurality of fans and/or the position of the plurality of return air dampers in response to determining a particle count of a compartment/zone exceeds a corresponding predetermined compartment/zone particle count.

9. The method of claim 8, wherein the first volume of air per unit of time is greater than the second volume of air per unit of time.

10. The method of claim 9, wherein the first level of energy consumption is greater than the second level of energy consumption, and the method further includes:
during transition from the first level of energy consumption to the second level of energy consumption, reducing a volume of air per unit of time supplied to the third compartment/zone first, reducing a volume of air per unit of time supplied to the first compartment/zone last, and reducing a volume of air per unit of time supplied to the second compartment/zone intermediate the reduction in the volumes of air per unit of time supplied to the third and first compartments/zones; and
during transition from the second level of energy consumption to the first level of energy consumption, increasing a volume of air per unit of time supplied to the first compartment/zone first, increasing a volume of air per unit of time supplied to the third compartment/zone last, and increasing a volume of air per unit of time supplied to the second compartment/zone intermediate the increase in the volumes of air per unit of time supplied to the first and third compartments/zones.

11. The method of claim 10, further comprising transitioning from the second energy consumption state to the first energy consumption state in response to determining a particle count of a compartment/zone exceeds a corresponding predetermined compartment/zone particle count.

12. The method of claim 11, further comprising transitioning from the first energy consumption state to the second energy consumption state in response to determining the particle count of each compartment/zone no longer exceeds the corresponding predetermined compartment/zone particle count.

13. A clean room control system comprising:
a plurality of speed adjustable fans operative for urging pressurized air into a number of compartments/zones of the clean room;
a plurality of position adjustable dampers disposed in air ducts that access the clean room; and
a controller operative for controlling the speeds of the fans and the positions of the dampers whereupon:
in a first energy consumption state of the fans to move a first volume of air per unit of time through the clean room, a differential air pressure is established in the clean room between a first compartment/zone and a second compartment/zone;
in a second energy consumption state of the fans to move a second, lesser volume of air per unit of time through the clean room, the differential air pressure is substantially maintained in the clean room between the first compartment/zone and the second compartment/zone; and changing the speeds of the plurality of fans and/or the position of the plurality of return air dampers in response to determining a particle count of a compartment/zone exceeds a corresponding predetermined compartment/zone particle count.

14. The clean room control system of claim 13, wherein the first compartment/zone has a higher air pressure than the second compartment/zone.

15. The clean room control system of claim 13, wherein the controller is further operative for controlling the speeds of the fans and the positions of the dampers whereupon:
during transition from the first energy consumption state to the second energy consumption state, the air pressure in the second compartment/zone is reduced before the air pressure in the first compartment/zone; and
during transition from the second energy consumption state to the first energy consumption state, the air pressure in the first compartment/zone is increased before the air pressure in the second compartment/zone.

16. The clean room control system of claim 15, further comprising a plurality of particle sensors in communication with the controller, wherein the controller transitions from the second energy consumption state to the first energy consumption state at least partially in response to at least one of the plurality of particle sensors detecting a particle count of a compartment/zone exceeds a corresponding predetermined compartment/zone particle count.

17. The clean room control system of claim 16, wherein the controller transitions from the first energy consumption state to the second energy consumption state at least partially in response to the plurality of particle sensors detecting the particle count of each compartment/zone no longer exceeds the corresponding predetermined compartment/zone particle count.

18. The clean room control system of claim 13, wherein, in response to the opening of a clean room door at a time when the clean room is either in the second energy consumption state or is in transition from the first energy consumption state to the second energy consumption state, the controller is operative for adjusting the speeds of the fans and the positions of the dampers substantially simultaneously to preset speeds and positions or to speeds and positions associated with the first energy consumption state.

19. The clean room control system of claim 13, wherein, the controller is further operative:
for storing the speeds of the fans and the positions of the dampers associated with each energy consumption state; and
for causing the speeds of the fans and the positions of the dampers associated with each energy consumption state to return to the stored speeds and positions upon entering said energy consumption state.

* * * * *